(12) United States Patent
VanHorn et al.

(10) Patent No.: US 11,922,788 B2
(45) Date of Patent: Mar. 5, 2024

(54) AVALANCHE TRANSCEIVER

(71) Applicant: BACKCOUNTRY ACCESS, INC., Boulder, CO (US)

(72) Inventors: David VanHorn, Boulder, CO (US); Christoffer Heckman, Boulder, CO (US); Bruce Edgerly, Boulder, CO (US)

(73) Assignee: BACKCOUNTRY ACCESS, INC., Boulder, CO (US)

( * ) Notice: Subject to any disclaimer, the term of this patent is extended or adjusted under 35 U.S.C. 154(b) by 0 days.

(21) Appl. No.: 18/005,758

(22) PCT Filed: May 16, 2022

(86) PCT No.: PCT/US2022/029401
§ 371 (c)(1),
(2) Date: Jan. 17, 2023

(87) PCT Pub. No.: WO2022/245707
PCT Pub. Date: Nov. 24, 2022

(65) Prior Publication Data
US 2023/0215262 A1 Jul. 6, 2023

Related U.S. Application Data

(60) Provisional application No. 63/190,500, filed on May 19, 2021.

(51) Int. Cl.
*G08B 21/04* (2006.01)
*G01S 5/02* (2010.01)
*G08B 25/10* (2006.01)

(52) U.S. Cl.
CPC ........ *G08B 21/0446* (2013.01); *G01S 5/0231* (2013.01); *G01S 5/0249* (2020.05); *G08B 25/10* (2013.01); *G01S 2205/06* (2020.05)

(58) Field of Classification Search
CPC .... G08B 21/0446; G08B 25/10; G08B 25/01; G01S 5/0231; G01S 5/0249; G01S 2205/06; G01S 5/0205
(Continued)

(56) References Cited

U.S. PATENT DOCUMENTS 6,246,863 B1 * 6/2001 Kampel .................. G01S 13/88
455/100
7,397,366 B2 * 7/2008 Kampel .................. G01S 1/047
342/146

(Continued)

FOREIGN PATENT DOCUMENTS

EP          3435108 B1    10/2019
WO    2017109422 A1     6/2019

OTHER PUBLICATIONS

International Search Report and Written Opinion dated Aug. 12, 2022, issued in corresponding international Application No. PCT/US2022/029401, filed May 16, 2022, 9 pages.

*Primary Examiner* — Eric Blount
(74) *Attorney, Agent, or Firm* — CHRISTENSEN O'CONNOR JOHNSON KINDNESS PLLC

(57) ABSTRACT

Avalanche transceiver, and associated systems and methods are disclosed herein. In one embodiment, a method for identifying a location of a victim buried in an avalanche includes: emitting a signal by a transmitting transceiver of the victim; receiving the signal by a receiving transceiver; and identifying an orientation from the receiving transceiver to the victim based on constructing a straight line from the receiving transceiver to the transmitting transceiver.

25 Claims, 3 Drawing Sheets

(58) Field of Classification Search
USPC .............................................. 340/539.1, 690
See application file for complete search history.

(56) References Cited

U.S. PATENT DOCUMENTS

| | | | | |
|---|---|---|---|---|
| 8,061,293 | B2* | 11/2011 | Auerbach | A63B 29/021 |
| | | | | 128/202.19 |
| 9,310,460 | B2* | 4/2016 | Matzner | A63B 29/021 |
| 10,802,794 | B2* | 10/2020 | Kotlaba | H04B 17/318 |
| 11,150,321 | B2* | 10/2021 | Lawitzky | G01S 5/02213 |
| 2005/0151662 | A1 | 7/2005 | Kashuba et al. | |
| 2005/0231359 | A1 | 10/2005 | Kampel et al. | |
| 2014/0191901 | A1 | 7/2014 | Matzner | |
| 2019/0250242 | A1* | 8/2019 | Lawitzky | G01S 5/02213 |
| 2020/0175841 | A1* | 6/2020 | Cholhan | H04W 4/021 |

* cited by examiner

AVALANCHE TRANSCEIVER

CROSS-REFERENCE(S) TO RELATED APPLICATION(S)

This application is a National Stage of International Application No. PCT/US2022/029401 filed May 16, 2022, which claims priority to U.S. Provisional Patent Application No. 63/190,500, filed May 19, 2021, which is incorporated by reference herein in its entirety.

BACKGROUND

Avalanche transceivers are devices carried by skiers, snowmobilers, snowshoers and other participants in snow sports and recreation. Avalanche transceivers emit signals that can be detected by a rescue team to help in pinpointing the location of buried victims.

Currently a challenge to avalanche transceiver performance is separation of signals coming from the transceivers of different buried victims. When their transmitted pulses overlap, it becomes difficult to track the signals from the buried victims and "mark" or "suppress" found victims. Some conventional avalanche transceivers can solve this problem by detecting minor frequency differences between different units to separate the transmit pulse pattern of each unit over time.

Furthermore, conventional avalanche transceivers follow the curving flux lines of the victim's signal. While this is not a challenge in single victim burials, it can be very challenging in the case of multiple victims, because the direction from the searchers toward the victim(s) is rarely accurate, since flux lines are curved. As a consequence, a user must follow this flux line carefully in order to be led to the buried transceiver. In the best case, this provides a path between a user and a victim's transceivers that is longer than the straight-line path. In the worst case, if the receiving transceiver is improperly used (e.g. through the user's rotating the transceiver relative to his/her heading), the user will see spurious results that will lead them in the incorrect direction.

Another challenge to existing transceivers is their limited receive range. For some conventional avalanche transceivers, the maximum range can be less than 40 meters even under optimal conditions.

Finally, a significant issue in performing a transceiver search is differentiating searchers that are inadvertently transmitting signals ("rogue signals") from victims that are actually buried. Such signals may further contaminate an already complicated electromagnetic field in the area of the avalanche. For instance, currently when conducting a search, all transceiver users in the vicinity are instructed through training to switch the mode of their transceivers to search mode; however, this step may be forgotten by some searchers. Furthermore, other users in the vicinity, not aware that a search is being conducted, will not switch their transceiver to search mode. Both of these sources of signals can serve to confuse a search party.

Accordingly, there remains a need for systems and methods that can precisely locate avalanche victims based on signals from their avalanche transceivers.

SUMMARY

Inventive technology is directed to locating avalanche victims. In different embodiments, the inventive technology includes the following:

(i) Straight-line searching instead of following curved electromagnetic flux lines. Stated differently, the inventive technology provides estimates of the end point of a curved line by a model, therefore estimating the end point of the transmitting transceiver, without following the curvature of the flux line itself.

(ii) Inertial measurement unit (IMU) being a part of the transceiver. Some examples of such IMUs include accelerometers, gyroscopes, compasses, magnetometers, etc. An IMU may be implemented as a simple micro-electro-mechanical system-on-a-chip (MEMS SoC) containing an accelerometer, gyroscope, and magnetometer capable of reading these quantities along 3 axes. Combined with a variety of signal processing techniques [1], the data from an IMU may be filtered to result in a probabilistically bias-corrected and noise-canceled odometry and heading information (using e.g., the complementary filter or the Madgwick filter) in a process known as dead-reckoning. In some embodiments, the IMUs may be 9-axis IMUs.

(iii) A machine learning technique that is also referred to as a model regression. This technique presumes a mathematical model of the electric field established when a transmitting transceiver generates pulses, and predicts the received signal strength indicator (RSSI) by a transceiver in search mode (per antenna) based on the relative position and orientation between the transmitting transceiver and the searching (signal-receiving) transceiver.

(iv) Estimating position and orientation of a stationary transmitting transceiver as the searching transceiver is in motion. For example, for each pulse received by the searching transceiver, that transceiver's position and orientation are known as a result of the IMU's filtered data. That position and orientation may be matched against the previous sequence of pulses' corresponding to RSSI, which relates to the relative position and orientation of the transmitting transceiver. Combined, these data may be regressed in order to probabilistically infer the position and orientation of the stationary transmitting transceiver. As more data are collected from that transmitting transceiver, the regressed estimate will converge, eliminating the effect of small electromagnetic disturbances or inaccuracies resulting from dead-reckoning. This procedure may be augmented with a variety of spatiotemporal filters which modulate the time complexity of calculating this estimate, or which can scale the importance of received pulses.

(v) Machine learning technique known as classification. For example, in presence of multiple transmitting transceivers, each pulse received by the searching transceiver must be uniquely associated with a particular transmitting transceiver. For each transmitting transceiver, a separate regression may be conducted. This association may be accomplished by regressing the pulse frequency of the transmitting transceiver and classifying pulses received at this frequency to be associated with a particular transceiver.

(vi) Elimination of suspect victim-moving signals ("rogue signals") by estimation algorithms. In principle, victim should not be moving with respect to a stationary searcher or other victims. At the data association stage, an assumption is made that any transmitting transceivers must be stationary, otherwise the model regression over RSSI for each pulse does not converge. Transmitting transceivers that appear to move, known as rogue (vii) Quadrature Sampling Detection (QSD) incorporated into an avalanche transceiver. The QSD enables better sampling, especially if multiple victims are present. The QSD may be used to detect signals below the noise floor, analyze frequency differences between units and better analyze transmit pulse patterns. The QSD enables approximating (through triangulation) where the victim is buried.
  (viii) Combining multiple frequencies in the transceiver communication. For example, communication may take place on one channel at 457 kHz and on another channel at the Bluetooth frequency. In some embodiments, the transceiver communication may start using just one channel (e.g., 457 kHz or other frequency). Then, as the location of victim is at least partially determined, the second Bluetooth channel may be activated to speed the convergence of the mathematical models (described below with reference to FIGS. 2 and 3) for determining the location of the transmitting transceiver. It should be understood that in the context of the present application, Bluetooth is used as an exemplary radio link, however other radio links, standardized or not, may also be used as the second channel. A person of ordinary skill will understand that, in a real search, the victim is probably suffering from asphyxia, and may also be suffering from internal injuries and significant bleeding. Shortening the search time is important so that the victim's airway can be cleared, and extraction and stabilization of the victim happens as quickly as possible.

signals, may be classified as such due to their estimates' non-convergence. Therefore, these pulses may be masked at the data association stage based on their classification.

BRIEF DESCRIPTION OF THE DRAWINGS

The foregoing aspects and many of the attendant advantages of this invention will become more readily appreciated with reference to the following detailed description, when taken in conjunction with the accompanying drawings, where.

DETAILED DESCRIPTION

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the term "about" means +/−5% of the stated value.

Figure 1:
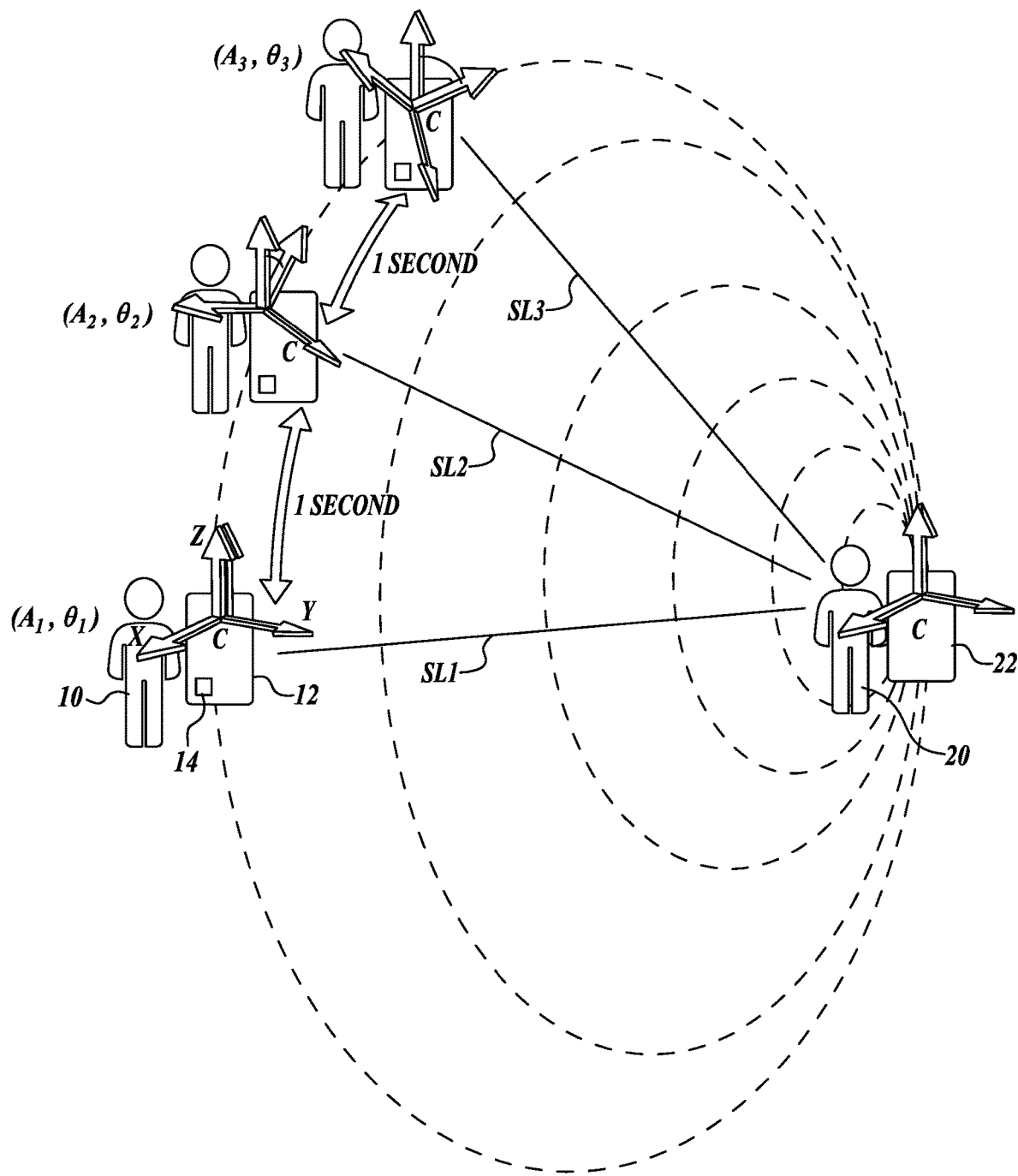
FIG. 1 is a diagram illustrating operation of a system in accordance with an embodiment of the present technology.

FIG. 1 is a diagram illustrating operation of a system in accordance with an embodiment of the present technology. FIG. 1 illustrates a searcher 10 having a receiving transceiver 12 (also referred to as a receiver or RX). The receiving transceiver may include a controller C (e.g., a microprocessor) and suitable software to perform computations. In some embodiments, the receiving (searching) transceiver 12 also includes one or more IMUs 14. Successive locations of the searcher 10 are indicated as $(A_i, \theta_i)$. These successive locations are temporally separated by a certain time duration, one second in the illustrated example.

A victim 20 has a transmitting transceiver 22. As explained above, the transmitting transceiver 22 (also referred to a transmitter or TX) may include a radio transmitter (either analog or digital). Analogously, the receiving transceiver 12 may include a radio receiver. The transmitting transceiver 22 and the receiving transceiver 12 may be multichannel transceivers. For example, the transmitting transceiver 22 and the receiving transceiver 12 may operate at 457 kHz and at Bluetooth frequency simultaneously or sequentially. In another nonlimiting example, the transmitting transceiver 22 and the receiving transceiver 12 may operate at 457 kHz (or other frequency regulated by European Telecommunications Standards Institute (ETSI)) and WiFi frequency. In some embodiments, the receiving transceiver may also include an IMU unit. The receiving transceiver and transmitting transceiver may be collectively referred to as a transceiver or TRX.

In some embodiments, an additional radio link (e.g., Bluetooth) may be added to the primary radio link. Due to the wavelength of ETSI mandated search frequency, ferrite rod antennas are used to transmit and to receive signals. The antennas are "reciprocal" in that the pattern and gain of the antenna is the same during transmit phase as it is during receive phase. It is known that ferrite rod antennas have at least two deep "nulls" where practically no signal is emitted or received. This causes large variations in received strength signal indicator (RSSI), and "spikes" during fine searching where the distance indication can jump from less than one meter to significantly greater than one meter, which can mislead even very experienced searchers.

Due to the dynamics of being buried in an avalanche, the orientation of the transmitting transceiver 22 is not known, and cannot be discovered until the victim is uncovered. Furthermore, ETSI requirements limit the pulses to one pulse per second nominal rate, with small variations allowed. Due to the ETSI requirements, and power consumption considerations, most transmitting transceivers 22 in practice transmit roughly one pulse per second. This means that the searcher only gets a distance update on every pulse. Furthermore, variations between manufacturers, models, and internal randomization software mean that a searcher has only an approximate idea of the pulse interval. In practice, it is possible to go right past the point of lowest distance because the buried transmitting transceiver 22 was not transmitting at that moment. Due to the above-described antenna pattern issues, users are trained not to rotate the searching transceiver, because this will cause distance measurement errors. While skilled users can usually do this reasonably well, this technique is difficult to follow in a disciplined way, and inexperienced users will naturally tend to rotate the transceiver during the fine search for the victim.

Since the second radio link (e.g., Bluetooth link at 2.4 GHz) operates outside ETSI specifications, the second radio link (channel) is also not constrained by the ETSI specifications. In the existing implementation, the second radio link may transmit/receive many pulses per second, updating the displayed distance much faster than by ETSI methods.

In practical operation, the frequency of 2.4 GHz (Bluetooth) may be significantly attenuated by water and snow. However, even though this attenuation would normally reduce the efficiency of the searchers, when the inventive two-channel technology is used the attenuation of the snow may in fact improve the search by limiting the secondary link (second channel, corresponding to Bluetooth in at least some embodiments) to a small radius around the victim, and not covering extended distances. This means that another searcher can be fine searching the location of the victim at the same time, a short distance away, without seeing the signal from the first victim on the secondary link. Such a scenario is not possible when relying on one channel only (e.g., 457 kHz or comparable ETSI frequency), necessitating special techniques like "marking" or "signal suppression" that can be confusing and ineffective in real world situations.

Without being bound to theory, it is believed that the actual time of flight (TOF) measurement on the secondary link (secondary channel) is short and generally insensitive to rotation or movement of the searching beacon, given the very short time interval of the pulse. Therefore, in operation the searchers can simply keep moving the receiving transceiver, noting the distance readings as they go. Since variations in signal strength caused by antenna patterns are ignored, rotations of the receiving transceiver (searching transceiver) are no longer an issue, unlike when relying on the primary ETSI link (channel) only.

In some embodiments, the search may proceed as follows. When the search begins, only the ETSI link (also referred to as the first channel or primary channel) is in use. The secondary link (e.g., Bluetooth link, WiFi link) on the buried transmitting transceiver 22 is listening periodically for the receiving transceiver 12, but remains in low power mode to conserve battery until the searcher is close. Once the buried transmitting transceiver 22 hears the searching transceiver on the secondary link (secondary channel), the buried transmitting transceiver 22 switches to normal mode and starts exchanging ranging data with the searching transceiver on both channels.

At this point, the searcher's receiving transceiver 12 starts using the high speed and more accurate data from the secondary link, while still hearing and processing the primary ETSI link (primary channel). In some embodiments, the user sees no difference in operation other than significantly faster updates that allow the searchers to perform the fine search much faster. The distance "spikes" which are generally an issue on the ETSI link (primary channel) are not present on the secondary link (secondary channel), allowing the search to proceed without confusing erroneous data being presented to the user.

It should be emphasized that the receiving transceiver 12 may still be listening to the ETSI transmissions (primary channel), and does not require the presence of the second radio link (second channel, e.g., Bluetooth) to function normally. However, the receiving transceiver 12 takes advantage of the second link when it is available. This method maintains ETSI compliance and interoperability with the receiving transceiver 12 that lacks this secondary link. For example, searches relying on a single channel would still progress, transparently to the searcher, who simply operates his transceiver normally in either case.

Therefore, if both the buried transmitting transceiver 22 and the searching transceiver 12 support the secondary link, the above-described advantage of the dual channel search would accrue. Otherwise, the searchers simply operate on a single, primary link.

In some embodiments, a "pulse customization" approach may be used. Here, during the trailhead check the pulse rate of the leader's transceiver is customized to minimize overlapping pulses with other members of the group.

Figure 2:
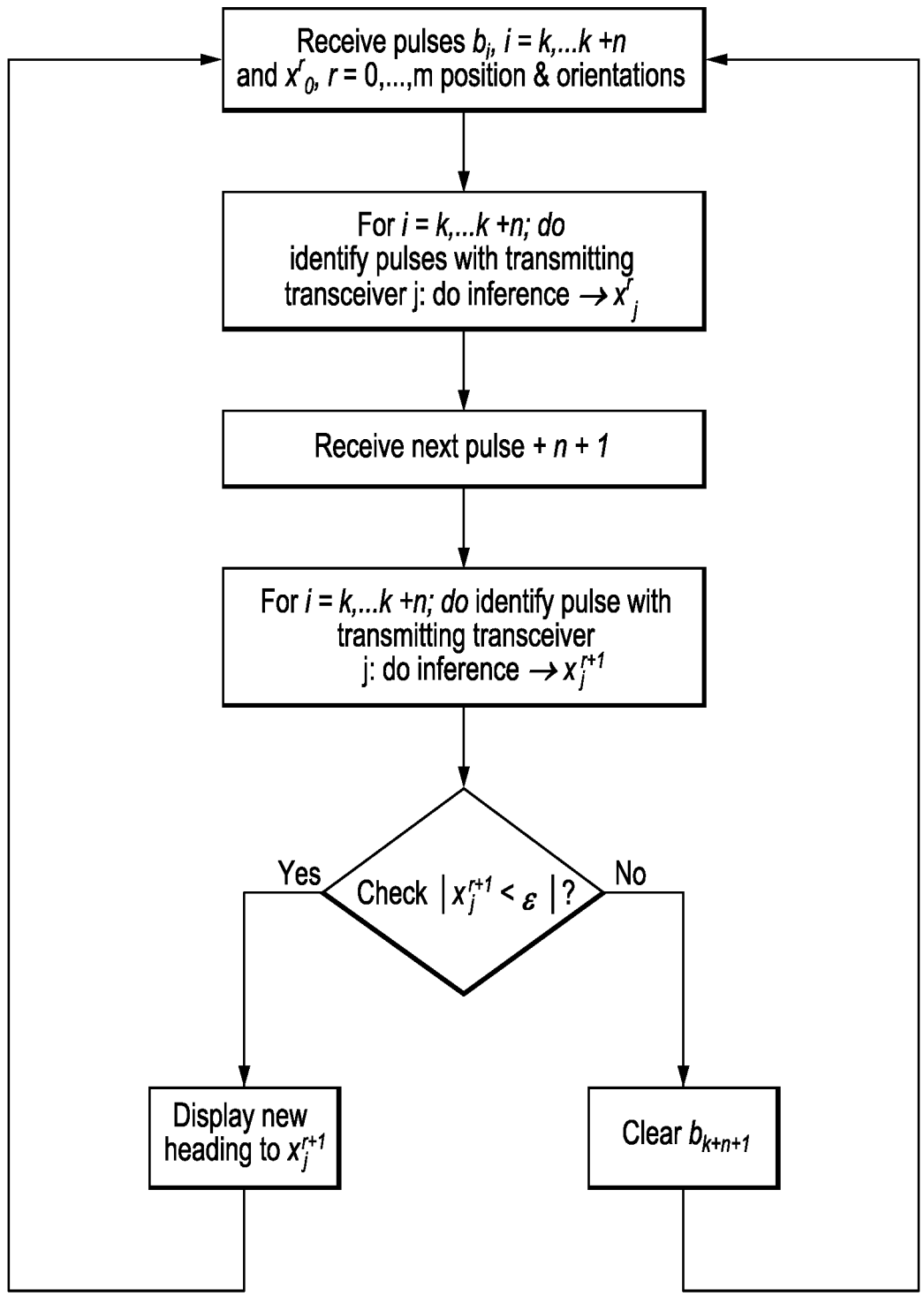
FIG. 2 is a flowchart of a method for identifying victim's location in accordance with embodiments of the presently disclosed technology.

FIG. 2 is a flowchart of a method for identifying a victim's location in accordance with embodiments of the presently disclosed technology. As explained above, identifying a victim's location as a straight line from the searcher to the victim may be advantageous. An example of such a straight line method is described below with reference to the searcher/victim layout illustrated in FIG. 1. Such a straight line (e.g., SL1, SL2, SL3 from FIG. 1) generally possesses an orientation and a length. Therefore, straight lines Sl1, SL2, SL3, etc., may be understood as vectors having an orientation (a vector angle that indicates a direction from the receiving transceiver to the transmitting transceiver) and a length (a vector length or a distance from the receiving transceiver to the transmitting transceiver). Therefore, the straight lines Sl1, SL2, SL3, etc., provide model-generated estimates of the end points of the electromagnetic flux line, thus estimating positions of the end point of the transmitting transceiver without following the curvature of the electromagnetic flux line itself. A person of ordinary skill will understand that the "straight lines Sl1, SL2, SL3" are mathematical concepts that do not necessarily imply that a searcher must follow these straight lines when approaching the victim. For example, the searcher may follow a curved path toward the buried victim as dictated, for instance, by the terrain that separates victim from the searcher. Furthermore, a person of ordinary skill will understand that generating a "straight line" (or a vector) by modeling engines does not necessarily imply that a straight line is indeed shown on the searcher's display. What is relevant is that the distance and direction from the searcher to victim are determined by the computational algorithms described below, whereas the straight line or the vector indicating this direction and distance is not necessarily walked-along by the searcher nor it is necessarily displayed on the display of searcher's transceiver.

Let $(A_1, \theta_1)$, $(A_2, \theta_2)$, $(A_3, \theta_3)$, ..., $m_i$ be the range $A_i$ and heading $\theta_i$ resolved from pulses bi received at positions and orientations $x^r$ (r enumerating those positions) by a receiving transceiver j (searcher) from the transmitting transceiver (victim). Without loss of generality, we may assume the headings $\theta_i$ are yaw angles defined by the plane between receiving transceiver 12 and transmitting transceiver 22, oriented with the receiving transceiver's antennae axes. Identification of the pulses to a specific transmitting j may be accomplished through a variety of methods, e.g., through signal clustering through k-means or radio frequency/amplitude fingerprinting techniques.

Position and orientation differences $x^r - x^{r+1}$ of the receiving transceiver 12 may be calculated through the integration of an inertial measurement unit (IMU)'s data between time stamps of those positions (r and r+1) at which a pulse is received from transmitting transceiver j.

For each of these pulses at positions and orientations with respect to the transmitting transceiver, an inference is conducted. This process may assume that the position and orientation differences between time r and r+1 is known based on the IMU integration, but it may also be considered that IMU measurement to be either an initial guess or a probabilistic prior, in both of these cases making these positions and orientations part of the inference problem.

Inference may be conducted through a variety of techniques. In some embodiments, such inference may be conducted through an optimization problem, e.g., the problem to be solved may be stated as: given a model M (x)=[A, $\theta$] of the magnetic field measurements from a transmitting transceiver 22, find the position and orientation $x^r$ of the receiving transceiver 12 such that:

$$\arg\min_{x}r\|M(x^r)-m_i\| \quad (1)$$

where $m_i$ is the measured magnetic field data for pulse $b_i$. It may be that some but not all these measurements are utilized in this optimization problem, with some measurements being set aside. This non-use of some measurements may be useful under some scenarios to avoid adversely affecting the quality of the solution to the problem.

The inference problem in expression (1) may be conducted over one, many, or all positions and orientations (and their corresponding pulses) that have been received since the transceiver has been receiving and identifying them to a transmitting transceiver. The inference problem in expression (1) may be conducted using a variety of numerical optimization techniques including first and second order minimization techniques, gradient-based techniques, and gradient-free techniques. Gradient-based techniques may include both automatic (numerical) differentiation techniques or using analytical gradients. The inference problem in expression (1) may also be conducted only over a subset of the quantities of interest (e.g., only over orientations and not positions).

In some embodiments, such inference may be conducted through probabilistic filtering, e.g., the problem to be solved may be stated as: given measurements $m_i$ magnetic field data for pulse $b_i$, after one or a series of these measurements, estimate a summary of the position, orientation, and potentially the statistics on these quantities, and incrementally estimate the position $x^r$ of the receiving transceiver with respect to the transmitting transceiver. This incremental estimation may be accomplished through the application of probabilistic filtering techniques which are embodied through discrete (e.g., particle filter-based) or continuous (e.g, Kalman filter-based) estimation of the position, orientation and potentially the statistics on these quantities.

Figure 3:
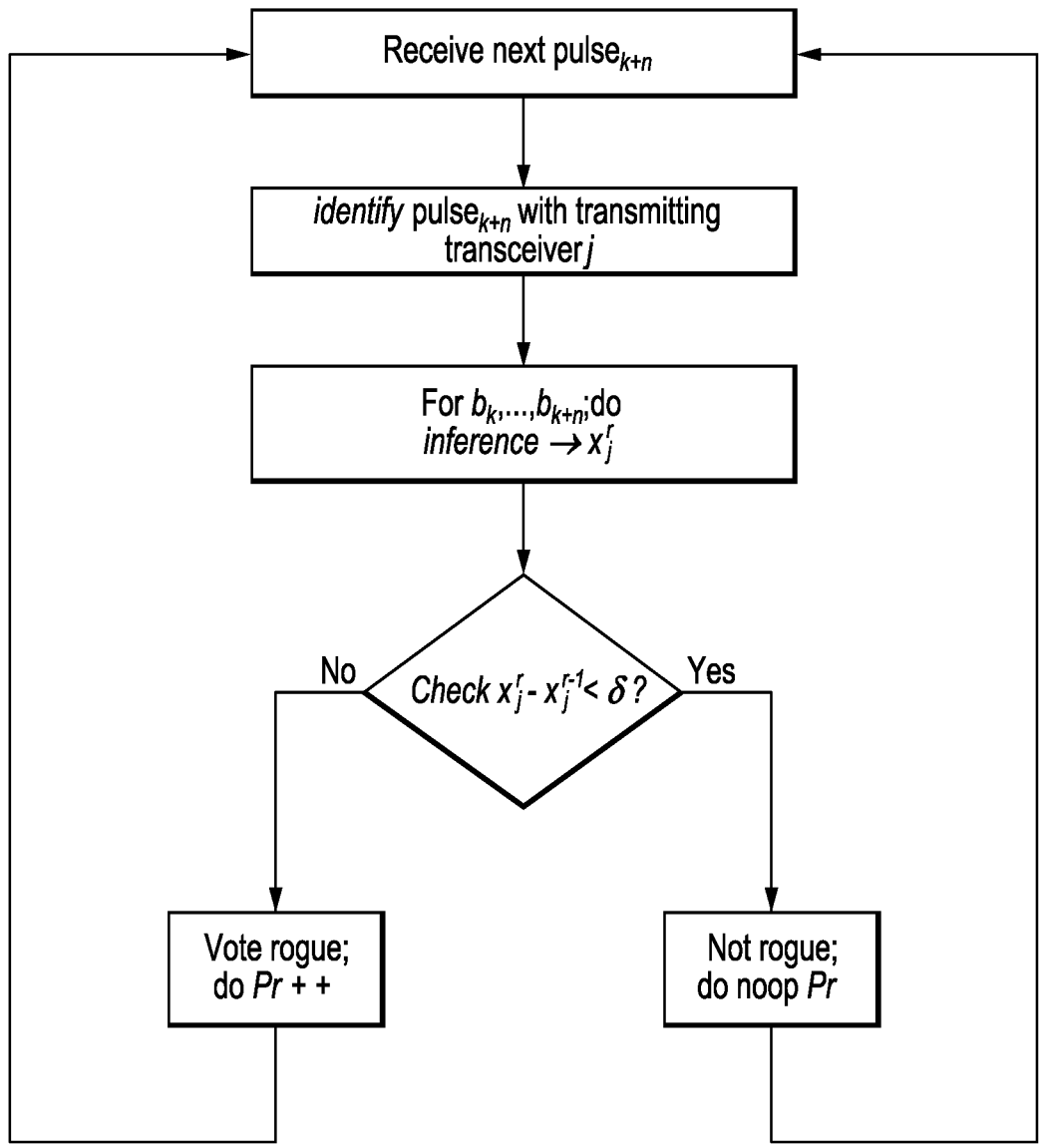
FIG. 3 is a flowchart of a method for eliminating rogue signals in accordance with embodiments of the presently disclosed technology.

FIG. 3 is a flowchart of a method for eliminating rogue signals in accordance with embodiments of the presently disclosed technology. The above formulation for inference in expression (1) assumes that a transmitting transceiver is approximately static in position and orientation. However, if this is not the case (e.g., a transmitting transceiver is experiencing significant motion), the above inference problem will result in high error. That is, the difference:

$$\|M(x^r)-m_i\| \quad (2)$$

will not converge to zero over the receipt of multiple pulses as $x^r$, by definition measuring the relative position and orientation of the receiving transceiver with respect to the transmitting transceiver. For every instance that the difference in expression (2) is greater than $\delta$, a counter designating the signal to be rogue $\rho_r$ is incremented. If a particular transmitting transceiver has $\rho_r > R$ for a threshold R, that transceiver may be considered a rogue transmitting transceiver and suppressed from the display of the receiving transceiver.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

What is claimed is:

1. A method for identifying a location of a victim buried in an avalanche, the method comprising:
    emitting a signal by a transmitting transceiver of the victim;
    receiving the signal by a receiving transceiver; and
    identifying an orientation from the receiving transceiver to the victim based on constructing a straight line from the receiving transceiver to the transmitting transceiver.

2. The method of claim 1, further comprising:
    identifying a position of the victim along the straight line by determining a distance from the receiving transceiver to the transmitting transceiver.

3. The method of claim 1, wherein the signal is emitted in two channels.

4. The method of claim 3, wherein one of the two channels operates at Bluetooth frequency or WiFi frequency.

5. The method of claim 4, wherein another of the two channels operates at a frequency of 457 kHz.

6. The method of claim 1, wherein the straight line is constructed based on finding a solution for:

$$\arg\min_{x}r\|M(x^r)-m_i\|$$

where $m_i$ is a measured magnetic field data for a pulse $b_i$ received at positions and orientations $x^r$.

7. The method of claim 6, wherein position and orientation differences $x^r-x^{r+1}$ of the receiving transceiver is determined from an inertial measurement unit (IMU) attached to a searcher.

8. The method of claim 7, wherein successive locations of the searcher correspond to the locations at which successive pulses are received from the transmitting transceiver.

9. The method of claim 7, wherein the IMU is a micro-electro-mechanical system-on-a-chip (MEMS SoC) that includes an accelerometer, gyroscope, and magnetometer.

10. The method of claim 1, further comprising:
acquiring signals from an inertial measurement unit (IMU) attached to the searcher;
based on the signals from the IMU attached to the searcher, determining whether the location of the victim is changed; and
if the location of the victim is changed, identifying the signal of the transmitting transceiver of the victim as a false signal.

11. The method of claim 1, wherein the receiving transceiver detects the signal from the transmitting transceiver by Quadrature Sampling Detection (QSD).

12. The method of claim 11, wherein the transmitting transceiver is a first transmitting transceiver emitting a first signal, and the victim is a first victim, the method further comprising:
emitting a second signal by a second transmitting transceiver of a second victim;
detecting the second signal by the receiving transceiver using the QSD; and
differentiating between locations of the first victim and the second victim at least in part based on frequency differences between the signals of the first transmitting transceiver and the second transmitting transceiver.

13. The method of claim 12, further comprising:
differentiating the first signal from the first victim and the second signal from the second victim is based on a machine learning technique.

14. The method of claim 13, wherein the machine learning technique is a differentiation.

15. A system for identifying a location of a victim buried in an avalanche, the system comprising:
a transmitting transceiver attached to the victim, wherein the transmitting transceiver is configured for emitting a signal; and
a receiving transceiver attached to a searcher and configured for receiving the signal,
wherein the receiving transceiver comprises a controller configured to identify an orientation from the receiving transceiver to the transmitting transceiver of the victim based on determining a straight line from the receiving transceiver to the transmitting transceiver.

16. The system of claim 15, wherein the controller is further configured to identify a position of the victim along the straight line by determining a distance from the receiving transceiver to the transmitting transceiver.

17. The system of claim 15, wherein the signal is emitted in two channels.

18. The system of claim 17, wherein one of the two channels operates at Bluetooth frequency or WiFi frequency.

19. The system of claim 18, wherein another of the two channels operates at a frequency of 457 kHz.

20. The system of claim 15, wherein the straight line is determined based on finding a solution for:

$$\arg\min_{x^r} \|M(x^r)-m_i\|$$

where $m_i$ is a measured magnetic field data for a pulse $b_i$ received at positions and orientations $x^r$.

21. The system of claim 20, further comprising an inertial measurement unit (IMU) attached to a searcher that carries the receiving transceiver, wherein position and orientation differences $x^r-x^{r+1}$ of the receiving transceiver is determined from the IMU.

22. The system of claim 20, wherein the IMU is a micro-electro-mechanical system-on-a-chip (MEMS SoC) that includes an accelerometer, gyroscope, and magnetometer.

23. The system of claim 22, wherein the controller is configured to identify the signal by the transmitting transceiver as a false signal if the victim's location changes.

24. The system of claim 15, wherein the signal from the transmitting transceiver is received by the receiving transceiver as a Quadrature Sampling Detection (QSD).

25. The system of claim 24, wherein the transmitting transceiver is a first transmitting transceiver emitting a first signal, and the victim is a first victim, the system further comprising:
a second transmitting transceiver attached to a second victim, wherein the second transmitting transceiver is configured for emitting a second signal,
wherein the receiving transceiver is configured for differentiating between locations of the first victim and the second victim at least in part based on frequency differences between the first transmitting transceiver and the second transmitting transceiver.

* * * * *